Oct. 27, 1942.　　　　R. AVIGDOR　　　　2,300,331

SEALING OF SHAFTS

Filed Oct. 17, 1938

Inventor:
R. Avigdor,
By E. F. Wenderoth
Atty

Patented Oct. 27, 1942

2,300,331

UNITED STATES PATENT OFFICE 2,300,331

SEALING OF SHAFTS

Rifat Avigdor, Geneva, Switzerland

Application October 17, 1938, Serial No. 235,526
In Germany July 16, 1938

5 Claims. (Cl. 286—26)

The invention relates to the sealing of shafts in particular of high speed electromotors of small capacity. Motors of this type, the so-called small electromotors, are used for various purposes, e. g. for the driving of pumps of plunging-pump-sets. The shaft of such a motor constituting the connection between the motor armature and the pump rotor for special reasons has to be sealed from the exterior.

It has already been proposed to use for this purpose a lip-shaped-seal. This seal comprises a sleeve member of rubber or another yielding and deformable substance. This member places itself with a relatively large surface against the shaft. This manner of sealing has the drawback that it considerably decreases the efficiency of the driving device on account of the considerable friction with the shaft, in particular for the reason that with small electromotors but a relatively small electric energy is available for the drive. However, since motors of this type are running at a high number of revolutions the increased friction between the seal and the shaft is particularly disadvantageous. At the sealing places heat is generated leading to a destruction of the sealing material and moreover affecting the shaft.

Seals of the gland type and the like cannot be used in machines of the above type since the contacting pressure of the sealing material against the shaft required for the sealing effect is much too strong in proportion to the driving energy available.

These drawbacks are removed by the invention by reason of the fact that the sealing members consist of discs of yielding material which are thin in proportion to their diameter. The material may be rubber, synthetic rubber, oil and petrol-proof impregnated fabric, or leather. These discs are superposed in layers at distances apart and the edges of the holes for the passage of the shaft are in engagement with the shaft. The diameter of the shafthole of each disc in flat undeformed state of the disc is smaller than the diameter of the shaft itself.

The inner edge region of each disc of yielding material is deformed by a superposed disc of stiff material in such a manner that said edge region is inclined to the shaft, i. e. makes an acute angle with the shaft. Between each set of discs consisting of a yielding and a stiff disc a ring of yielding material is located. The interior diameter of this ring is larger than the diameter of the hole in the stiff disc. The ring therefor only serves as a spacing member.

The discs and rings arranged in layers are enclosed in a casing that, with the exception of the holes for the passage of the shaft, is closed. In a casing various similar groups of layers may be arranged differing from one another in the direction of the hole edge regions of the sealing discs relatively to the shaft.

The invention will be more fully understood with reference to the accompanying drawing, illustrating it by way of example.

Figure 2:
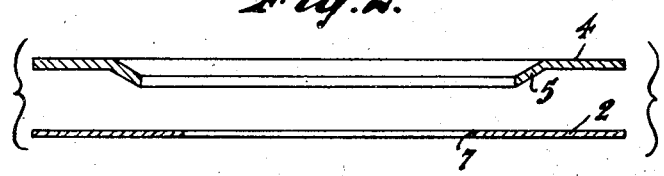
Figs. 2 and 3 show on a larger scale particularities of the parts of which the seal is composed.
Figure 3:
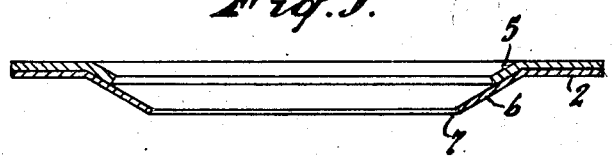

1 denotes the shaft to be sealed. The sealing discs 2 are superposed with intermediate spacing-rings 3. Upon each sealing disc 2 a metal disc 4 is located, the inner edge-region 5 of which is bent downwardly as shown on a larger scale in Figs. 2 and 3. When the metal disc 4 is placed upon the thin rubber disc 2, the inner edge region of the rubber disc is also bent downwardly to a certain extent, i. e. so that the inner hole-edge 7 of the rubber disc 2 will be at an incline to the shaft 1, i. e. makes an acute angle therewith. The friction with the shaft of a seal composed of discs of this type is relatively small. Nevertheless the seal hermetically seals the space above the shaft with respect to the space underneath the shaft.

Figure 1:
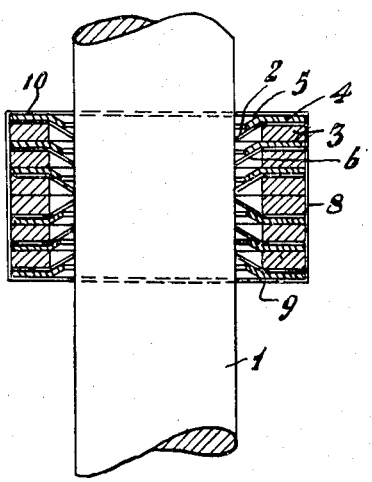
Fig. 1 is a view of a shaft-portion with seal according to the invention.

It appears from Fig. 1 that the three upper rings 2 have their edge-regions directed opposite to those of the two lower rings. In this manner a liquid above the seal is prevented from passing through downwards, whereas a liquid underneath the shaft is prevented from penetrating upwards.

In accordance with the different pressures in the liquids the seals may be composed of different numbers of discs 2.

The seal is located in a casing 8, which with the exception of the holes for the passages of the shaft, is closed by a bottom 9 and a cover 10.

I claim:

1. In a shaft seal the combination comprising a plurality of disc-shaped sealing members of yielding material, each of said members having a center hole and being thin in proportion to its diameter, the diameter of said hole being smaller than the diameter of the shaft while said member is flat, intermediate discs of stiff material for keeping the inner periphery regions of said yielding discs in an inclined position relative to the longitudinal axis of the shaft, said stiff discs being out of contact with said shaft, and a ring of yielding material located between adjacent sets of discs, each set comprising a yielding and a stiff disc, the interior diameter of said ring being larger than the diameter of the hole in the stiff disc.

2. In a shaft seal the combination comprising a plurality of disc-shaped sealing members of yielding material, each of said members having a center hole in which the shaft is received and being thin in proportion to its diameter, the diameter of said hole being less than the diameter of said shaft when in flat condition, a disc of metallic material cooperating with each of said members having a central aperture with a diameter greater than the diameter of said shaft and having the peripheral portion thereof adjacent said aperture inclined to the body of said disc so that when associated with each member the inner peripheral portion of said member adjacent said hole is distorted and inclined relative to the longitudinal axis of the shaft and a ring of yielding material having a central aperture with a diameter greater than the diameter of said aperture in said disc located between each set of cooperating members and discs.

3. In a shaft seal the combination comprising a plurality of disc-shaped sealing members of yielding material, each of said members having a center hole in which the shaft is received and being thin in proportion to its diameter, the diameter of said hole being less than the diameter of said shaft when in flat condition, a disc of metallic material cooperating with each of said members having a central aperture with a diameter greater than the diameter of said shaft and having the peripheral portion thereof adjacent said aperture inclined to the body of said disc so that when associated with each member the inner peripheral portion of said member adjacent said hole is distorted and inclined relative to the longitudinal axis of the shaft, a ring of yielding material having a central aperture with a diameter greater than the diameter of said aperture in said disc located between each set of cooperating members and discs and a casing of cylindrical form having an aperture at the top and bottom thereof for said shaft enclosing said members, discs and rings.

4. In a shaft seal the combination comprising a plurality of disc-shaped sealing members of yielding material, each of said members having a center hole in which the shaft is received and being thin in proportion to its diameter, the diameter of said hole being less than the diameter of said shaft when in flat condition, a disc of metallic material cooperating with each of said members having a central aperture with a diameter greater than the diameter of said shaft and having the peripheral portion thereof adjacent said aperture inclined to the body of said disc so that when associated with each member the inner peripheral portion of said member adjacent said hole is distorted and inclined relative to the longitudinal axis of the shaft and a ring of yielding material having a central aperture with a diameter greater than the diameter of said aperture in said disc located between each set of cooperating members and discs, certain of said discs having their inclined portions directed in one direction with relation to the longitudinal axis of said shaft while the remainder of said discs have their inclined portions directed in the opposite direction so that seepage is prevented along said shaft in both directions.

5. In a shaft seal the combination comprising a plurality of yielding sealing members, each of said members having a center hole of less diameter than the shaft to be received therein, a disc cooperating with each sealing member having a central aperture of greater diameter than the diameter of said shaft, each disc having means thereon for distorting the inner peripheral portion of each sealing member to accommodate said shaft and a yielding spacing ring located between each set of cooperating members and discs.

RIFAT AVIGDOR.